L. H. SOLOMON.
POULTRY WATERING DEVICE.
APPLICATION FILED APR. 12, 1918.
1,315,047.
Patented Sept. 2, 1919.
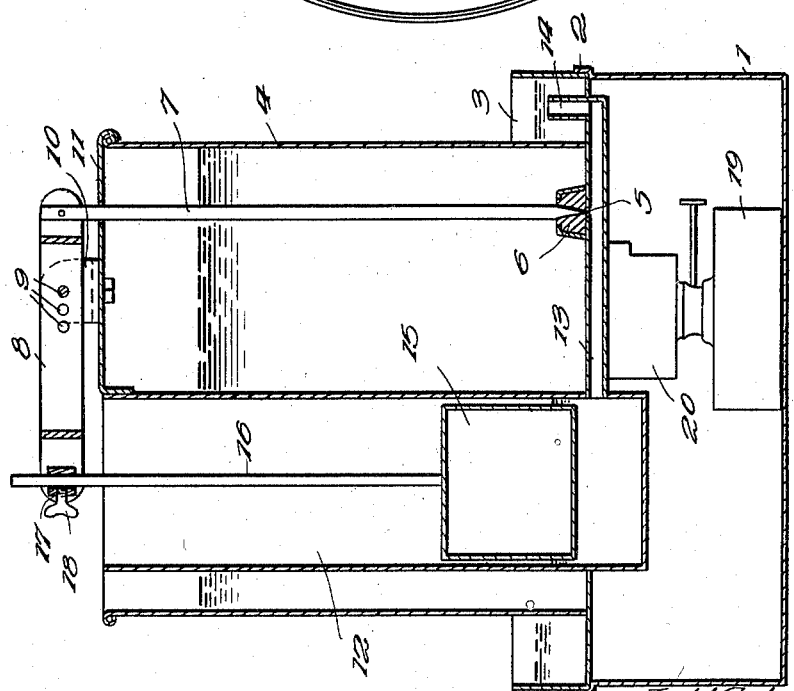
L. H. Solomon, Inventor
By Geo. P. Kimmel
Attorney

UNITED STATES PATENT OFFICE.

LUCIUS H. SOLOMON, OF TIFFIN, OHIO.

POULTRY WATERING DEVICE.

1,315,047.　　　　Specification of Letters Patent.　　Patented Sept. 2, 1919.

Application filed April 12, 1918. Serial No. 228,124.

*To all whom it may concern:*

Be it known that I, LUCIUS H. SOLOMON, a citizen of the United States, residing at Tiffin, in the county of Seneca and State of Ohio, have invented certain new and useful Improvements in Poultry Watering Devices, of which the following is a specification.

This invention relates to improvements in watering devices and it is the principal object of the invention to provide a float control watering device for use by poultry, whereby the level of the water in the drinking pan thereof will be maintained at a predetermined point at all times, providing that the supply or reservoir of the device contains water, thus, rendering the same exceedingly convenient, as well as sanitary.

It is also an object of the invention to provide the device with a noval adjustable water control means whereby the level of the water in the drinking pan can be varied as desired.

The invention consists, furthermore, in the novel arrangements and combinations of the parts of the device, as well as in the details of the construction of the same, all of which will be more fully described in the following specification and then finally embodied in the clauses of the claim which are appended to this specification and which form an essential part of the same.

In the drawings:

Figure 1 is a vertical section through the improved watering device, and

Fig. 2 is a top plan thereof.

Having more particular reference to the drawings, in connection with which like reference characters will designate corresponding parts throughout the several views. 1 represents the base of the device, the same comprising an annular pan having the upper portion thereof flanged as at 2 to provide an annular seat for the drinking pan 3 of the device. Disposed concentrically of the drinking pan 3 is a reservoir or supply tank 4 having an opening 5 arranged in the bottom thereof and provided with a valve seat 6 which is adapted to receive the ordinary type of needle valve 7 thereon at times; the upper end of the valve being pivotally connected to one end of a lever 8 provided with a plurality of pivot openings 9, one of which is engaged by a pivot pin arranged on a bracket 10 adjustably engaged with a slotted strip 11 secured to the upper portion of the reservoir and the secondary chamber hereinafter more fully described.

Arranged in the reservoir 4 is a secondary chamber 12, the bottom of which is disposed at a point below the bottom of the reservoir and has one end of a conduit 13 tapped thereinto, said conduit extending along the bottom of the reservoir and upwardly into the drinking pan 3 as at 14. In this connection, it is to be noted that the conduit 13 communicates with the opening or port 5 formed in the bottom of the tank 4 and as a consequence, the water therefrom will be discharged into the same and thus conveyed to the drinking pan 3. Loosely arranged in the secondary chamber 12 is a float 15 having a rod 16 extending vertically therefrom and adjustably connected to a swivel collar 17 carried on the adjacent end of the lever 8, said collar being connected to the rod 13 by means of a set screw 18 or like device.

As means for maintaining the temperature of the water in the reservoir and drinking pan above freezing point in cold weather, an oil burner 19 is arranged in the annular base 1 adjacent a depending apertured collar 20 formed upon a portion of the reservoir bottom at a point adjacent the conduit 13. Obviously, the lamp may be placed in the annular base 1 by removing the drinking pan 3 and as a consequence the reservoir 4 and the secondary chamber 12 therein, or the same may be placed therein through a suitable opening formed in one side of the base and provided with a closure, not shown.

In operation, and assuming that the reservoir 4 is filled with water, a portion of the same will flow by way of the opening 5 and conduit 13 into the secondary chamber 12 and the drinking pan 3. As the water level rises in the drinking pan 3 and the secondary chamber 12, the float 15 will be engaged thereby and upon upward movement will cause the needle valve 7 to be seated at 6, thus interrupting the flow of water from the tank 4 into the conduit 13. However, when the water level in the tank 3 is again lowered by the poultry, the float 15 will be permitted to lower and as a consequence cause the rising of the needle valve 7 and the resultant opening of the port 5 whereupon the pan and chamber 12 will be resupplied. Should it be desired, the fulcrum point of the lever 8 may be varied by adjusting the bracket 10 and the pivot pin carried thereby in the desired opening 9.

Manifestly, the construction shown is capable of considerable modification and such modification as is within the scope of my claims, I consider within the spirit of my invention.

I claim:

1. In a watering device, a pan, a reservoir arranged therein, a secondary chamber arranged in the reservoir and having communication with the pan, a valve controlling the passage of liquid from the reservoir to the pan, a lever, an adjustable pivotal support for the lever supported upon the reservoir, means connecting the valve and lever, a float arranged in the secondary chamber, and an adjustable connection between the float and lever.

2. In a watering device, a pan, a reservoir arranged therein, a secondary chamber arranged in the reservoir and having communication with the pan, a valve controlling the passage of liquid from the reservoir to the pan, a lever, means connecting the valve with the lever, a bracket adjustably secured upon the reservoir, an adjustable pivotal connection between the bracket and lever, a float located in the secondary chamber, a rod carried by the float, and an adjustable connection between the rod and lever.

In testimony whereof, I affix my signature hereto.

LUCIUS H. SOLOMON.

Copies of this patent may be obtained for five cents each, by addressing the "Commissioner of Patents, Washington, D. C."